June 28, 1932. E. W. BOEHNE 1,865,409
PROTECTIVE APPARATUS
Filed May 28, 1930
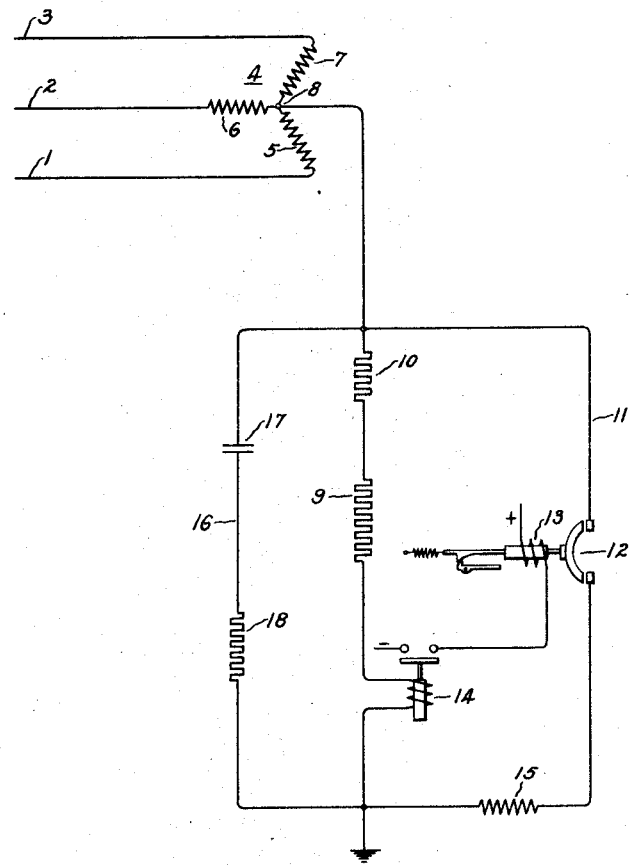
Inventor:
Eugene W. Boehne,
by Charles E. Tullar
His Attorney.

Patented June 28, 1932

1,865,409

UNITED STATES PATENT OFFICE

EUGENE W. BOEHNE, OF SCOTIA, NEW YORK, ASSIGNOR TO GENERAL ELECTRIC COMPANY, A CORPORATION OF NEW YORK

PROTECTIVE APPARATUS

Application filed May 28, 1930. Serial No. 456,618.

My invention relates to improvements in protective apparatus for electric circuits and more particularly for circuits which include the windings of inductive apparatus such as dynamo-electric machines, transformers, etc. An object of my invention is to provide an improved arrangement whereby to prevent the formation of excessive voltages in the windings of such apparatus on the occurrence of voltage surges impressed on the line terminals of the windings in consequence of lightning discharges, switching, etc., and whereby to avoid harmonic interference with communication circuits.

There is an increasing tendency to connect dynamo-electric machines and particularly generators directly to overhead lines. When so connected they are more susceptible to danger from transient surges due to lightning, switching, etc., than when an intervening transformer is used. Harmonic interference with communication circuits is also apt to be more troublesome. While lightning arrestors may limit the surge voltage entering the machine, they do not control the oscillations which may occur within the machine. One reason why transient surges cause trouble in electrical apparatus is that they require a definite time to travel a given distance. On an open line a surge travels at the velocity of light so that at a given instant one point of a line may be at normal voltage while another point some distance away may have a much higher voltage. In machine windings the circuits are concentrated in a frame of magnetic material and the velocity is greatly reduced. Consequently, considering two points in a winding, they may be electrically far apart although physically having but little insulation between them. Moreover, these surges follow definite laws of reflection at any discontinuity of circuit such that oscillations tend to occur and are apt to cause excessive voltage stresses. Any attempt to avoid these stresses which involves grounding the machine windings preferably should not introduce harmonic interference with communication circuits. This is especially important with salient pole machines such as synchronous condensers which, like hydraulic turbine driven generators, have a high percentage of third harmonics and which have to be near the load, and, therefore, are apt to be near communication circuits. Also any grounding arrangements employed preferably should not interfere with the flow of power current, that is system frequency current necessary, for example, for proper relaying under ground fault conditions. In accordance with my invention I provide an improved grounding arrangement for avoiding excess voltage stresses under transient surge voltage conditions such that on the occurrence of ground faults the necessary power current may flow and such that harmonic interference with communication circuits is substantially prevented.

My invention will be better understood from the following description when considered in connection with the accompanying drawing and its scope will be pointed out in the appended claims.

The single figure of the accompanying drawing illustrates diagrammatically an embodiment of my invention as applied to a polyphase system herein shown as including a three-phase circuit having phase conductors 1, 2, 3 and polyphase apparatus 4 having inductive windings 5, 6, 7 connected between said conductors at a common point 8. The apparatus 4 may be a dynamo-electric machine or a transformer whose phase windings have one terminal connected to the respective phase conductors of the circuit and the other terminal connected to the neutral point 8, that is star connected in case of a three-phase system. A transient voltage disturbance, such as a lightning discharge or switching surge which involves any one or more of the conductors 1, 2, 3, will enter one or more of the corresponding windings 5, 6, 7 and, by reason of reflection, the terminals thereof tend to form oscillations. These oscillations may subject the windings to voltages twice as great as the transient voltage applied at the line terminal. Since these voltages produce dangerous stresses by reason of the concentration of the winding conductor in which the voltages are established, it is desirable that the voltages be held to some desirable minimum for which insulation can economically be provided. For example, if lightning arresters are employed and they hold the applied surge voltage which reaches the line terminals of the windings to some predetermined value E, then it is desirable that the voltage in the neutral be not allowed to exceed this same value.

In accordance with my invention, I prevent these oscillations and excessive voltages by providing from a common point of the windings to ground a connection whose resistance 9 is substantially equivalent to the combined surge impedance of all the windings 5, 6, 7 that is their impedance in parallel to their common point 8. If the windings are substantially similar and their mutual effect is small as in most practical cases, then the resistance 9 may have the value $\frac{Z}{n}$, where Z is the surge impedance of one winding, that is $\frac{L}{C}$, L and C being respectively the inductance and the capacitance of a winding and $n$ the number of windings connected in parallel to the neutral.

While the resistance 9 may be of any suitable type, I preferably employ, in order to reduce harmonic interference with communication circuits, a resistance of the so-called negative volt-ampere characteristic type. Such a resistance having no time lag is disclosed in the copending application of K. B. McEachron, Serial No. 198,512, filed June 13, 1927 and assigned to the same assignee as this invention. The characteristic of this resistance is of the form $I = KE^n$, I and E being current and voltage respectively, K a constant and $n$ an exponent greater than one. With such a characteristic it will be obvious that the amount of harmonic current which can flow is practically negligible since the voltage tending to produce this current is relatively low particularly in comparison with the voltage which occurs under transient conditions. In other words, the resistance for the harmonic currents is high. I may connect, in order to provide flexibility in the characteristic of the leads of the ground connection, another resistance 10 in circuit with the resistance 9, the two together providing the desired resistance on the surge impedance basis previously described.

Inasmuch as the resistance 9 is not adapted to have large currents at the voltage and frequency of the power system current, I preferably provide means for short-circuiting the resistance 9 under predetermined abnormal conditions whereby to avoid possibility of danger to this resistance and to insure a path for power currents such as to permit a desired ground current to flow to take care of the usual ground fault protection of the windings. As shown, this means includes a normally open circuit 11 which is arranged to be connected in parallel with the resistor 9 by suitable switching means such as a circuit breaker 12 having a closing coil 13. For controlling this circuit breaker to effect the closing thereof on the occurrence of abnormal circuit conditions, I provide means which, as shown, is a relay 14 responsive to current flowing in the grounding connection resistance 9. The relay 14 will be set so as not to operate on the small current under normal operation or on transient surges but will operate in a short time after ground fault current at power frequency begins to flow. This time should be greater than the longest transient wave which it is expected will occur in practice. In order to limit the ground current, at power frequency to some predetermined value, a resistance 15 may be provided in series with the circuit breaker 12.

Under certain conditions, I may provide another circuit 16 in parallel with the resistance 9. As shown, this circuit includes a capacitance 17 and a resistance 18. The function of this circuit is to act as a reservoir for energy and a reasonable time constant to absorb the shock in sudden change in circuit due to the closing operation of the switch 12 where such is employed. This parallel circuit 16 can ordinarily be dispensed with because the windings 5, 6, 7 are ordinarily at the same potential and possess sufficient capacitance to protect their turn insulation on the resulting steep wave due to the switch closing operation.

While I have shown and described my invention in considerable detail, I do not desire to be limited to the exact arrangement shown but seek to cover in the appended claims all those modifications that fall within the true spirit and scope of my invention.

What I claim as new and desire to secure by Letters Patent of the United States, is,—

1. In combination with a polyphase circuit including polyphase apparatus having a plurality of inductive windings, one terminal of the windings being connected to the respective conductors of the circuit and the other terminal of the windings being connected to a common point, a connection to ground from said point having an ohmic resistance substantially equivalent to the combined surge impedance of said plurality of windings.

2. In combination with a polyphase circuit including polyphase apparatus having a plurality of inductive windings, one terminal of the windings being connected to the respective conductors of the circuit and the other terminal of the windings being connected to a common point, a connection to ground from said point including a negative volt-ampere characteristic resistance whose ohmic value under predetermined voltage conditions is substantially equivalent to the combined surge impedance of said plurality of windings.

3. In combination with a polyphase circuit including polyphase apparatus having a plurality of inductive windings, one terminal of the windings being connected to the respective conductors of the circuit and the other terminal of the windings being connected to a common point, a connection to ground from said point including a negative volt-ampere characteristic resistance whose ohmic value under predetermined voltage conditions is at least substantially equivalent to the combined surge impedance of said plurality of windings, and means for short-circuiting said resistance in response to predetermined abnormal circuit conditions.

4. In combination with a three-phase circuit and a three-phase dynamo-electric machine having a neutral connected to ground, a negative volt-ampere characteristic resistance in said ground connection having an ohmic value under predetermined voltage conditions substantially equivalent to the surge impedance of the phase windings of the dynamo-electric machine in parallel.

5. In combination with a three-phase circuit and a three-phase dynamo-electric machine having a neutral connected to ground, a negative volt-ampere characteristic resistance in said ground connection having an ohmic value under predetermined voltage conditions substantially equivalent to the surge impedance of the phase windings of the dynamo-electric machine in parallel and means responsive to a predetermined flow of current in said resistance for short-circuiting the resistance.

6. In combination with an electric circuit having $n$ conductors and $n$ windings connected between said conductors and a common point, a connection to ground from said point having an ohmic resistance substantially equivalent to $\frac{Z}{n}$, where Z represents the surge impedance of one of said windings.

7. In combination with an electric circuit having $n$ conductors and $n$ windings connected between said conductors and a common point, a connection to ground from said point having an ohmic resistance substantially equivalent to the combined surge impedance of said $n$ windings.

8. In combination with an electric circuit having $n$ conductors and $n$ windings connected between said conductors and a common point, a connection to ground from said point including a negative volt-ampere characteristic resistance having an ohmic value under maximum surge voltage conditions substantially equivalent to $\frac{Z}{n}$, where Z represents the surge impedance of one of said windings.

9. In combination with an electric circuit having $n$ conductors and $n$ windings connected between said conductors and a common point, a connection to ground from said point including a negative volt-ampere characteristic resistance having an ohmic value under maximum surge voltage conditions substantially equivalent to $\frac{Z}{n}$, where Z represents the surge impedance of one of said windings, and means responsive to a predetermined abnormal circuit condition for establishing another connection to ground from said point independent of said resistance.

10. In combination with a polyphase circuit including polyphase apparatus having a pluralty of inductive windings, one terminal of the windings being connected to the respective conductors of the circuit and the other terminal of the windings being connected to a common point, a connection to ground from said point including a negative volt-ampere characteristic resistance.

11. In combination with an alternating current circuit having a neutral point, a connection to ground from said neutral point including in circuit therewith a negative volt-ampere characteristic resistance.

In witness whereof, I have hereunto set my hand this 27th day of May, 1930.

EUGENE W. BOEHNE.